United States Patent
Tauchi et al.

(10) Patent No.: US 8,872,644 B2
(45) Date of Patent: Oct. 28, 2014

(54) DRIVING DIAGNOSIS INFORMATION PROVIDING APPARATUS AND SYSTEM

(75) Inventors: Nobutaka Tauchi, Toyoake (JP); Kousuke Yamaoka, Kariya (JP); Shojiro Takeuchi, Tokyo (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 209 days.

(21) Appl. No.: 13/002,054

(22) PCT Filed: Jul. 27, 2009

(86) PCT No.: PCT/JP2009/063711
§ 371 (c)(1),
(2), (4) Date: Feb. 8, 2011

(87) PCT Pub. No.: WO2010/013826
PCT Pub. Date: Feb. 4, 2010

(65) Prior Publication Data
US 2011/0140874 A1    Jun. 16, 2011

(30) Foreign Application Priority Data
Aug. 1, 2008   (JP) .................. 2008-200005

(51) Int. Cl.
*B60Q 1/00* (2006.01)
*G08G 1/00* (2006.01)
*G01C 21/26* (2006.01)

(52) U.S. Cl.
CPC . *G01C 21/26* (2013.01); *G08G 1/20* (2013.01)
USPC .......................................... 340/438; 701/29.1

(58) Field of Classification Search
CPC ............... G07C 5/085; G07C 5/0808–5/0816; B60W 50/14; A61B 5/18
USPC ........ 340/425.5, 438–442; 701/29, 29.1–34.4
See application file for complete search history.

(56) References Cited

U.S. PATENT DOCUMENTS

| 628,332 A | 7/1899 | Josephs |
| 4,004,269 A * | 1/1977 | Arai et al. ..................... 340/454 |

(Continued)

FOREIGN PATENT DOCUMENTS

| JP | 10-203197 A | 8/1998 |
| JP | 10-288942 | 10/1998 |

(Continued)

OTHER PUBLICATIONS

International Search Report and Written Opinion of the International Searching Authority mailed on Sep. 15, 2009 for the corresponding International patent application No. PCT/JP2009/063711.

(Continued)

*Primary Examiner* — Hai Phan
*Assistant Examiner* — Orlando Bousono
(74) *Attorney, Agent, or Firm* — Posz Law Group, PLC

(57) ABSTRACT

A driving diagnosis information providing apparatus for a vehicle is disclosed. The driving diagnosis information providing apparatus acquires vehicle information indicative of a vehicle state, and makes a diagnosis of a driving state of the vehicle based on the vehicle information. The driving diagnosis information providing apparatus acquires, as useful information, one of announce information and helpful information. The announce information includes information to be reported to a driver of the vehicle. The helpful information includes information helpful for driving. The driving diagnosis information providing apparatus notifies the driver of diagnosis information indicative of a result of the diagnosis, and notifies the useful information in place of the diagnosis information under a predetermined condition.

11 Claims, 10 Drawing Sheets

(56) References Cited

U.S. PATENT DOCUMENTS

| | | | |
|---|---|---|---|
| 4,058,796 A | | 11/1977 | Oishi et al. |
| 4,348,663 A | * | 9/1982 | Yanagishima et al. ........ 340/576 |
| 4,454,497 A | * | 6/1984 | Morse ........................... 340/438 |
| 4,845,630 A | | 7/1989 | Stephens |
| 4,884,054 A | * | 11/1989 | Moon, Sr. .................. 340/457.4 |
| 4,949,242 A | | 8/1990 | Takeuchi et al. |
| 4,987,541 A | | 1/1991 | Levente et al. |
| 5,311,430 A | * | 5/1994 | Ishigami ....................... 701/29.4 |
| 5,483,446 A | | 1/1996 | Momose et al. |
| 5,546,305 A | | 8/1996 | Kondo |
| 5,693,876 A | | 12/1997 | Ghitea, Jr. et al. |
| 5,913,917 A | | 6/1999 | Murphy |
| 6,052,644 A | | 4/2000 | Murakami et al. |
| 6,092,021 A | | 7/2000 | Ehlbeck et al. |
| 6,275,231 B1 | * | 8/2001 | Obradovich .................. 345/156 |
| 6,415,224 B1 | | 7/2002 | Wako et al. |
| 6,453,731 B1 | | 9/2002 | Yaegashi |
| 6,542,077 B2 | * | 4/2003 | Joao ........................... 340/426.16 |
| 6,577,927 B2 | * | 6/2003 | Shimazu ........................... 701/1 |
| 6,990,407 B1 | | 1/2006 | Mbekeani et al. |
| 7,565,230 B2 | | 7/2009 | Gardner et al. |
| 2002/0091473 A1 | | 7/2002 | Gardner et al. |
| 2002/0120371 A1 | | 8/2002 | Leivian et al. |
| 2002/0120374 A1 | * | 8/2002 | Douros et al. .................. 701/29 |
| 2002/0121969 A1 | | 9/2002 | Joao |
| 2003/0060977 A1 | | 3/2003 | Jijina et al. |
| 2003/0069683 A1 | | 4/2003 | Lapidot et al. |
| 2003/0191566 A1 | | 10/2003 | Ben-Assa |
| 2004/0030458 A1 | | 2/2004 | Entenmann |
| 2004/0064337 A1 | | 4/2004 | Nakahara et al. |
| 2005/0125117 A1 | * | 6/2005 | Breed ............................. 701/29 |
| 2005/0159870 A1 | * | 7/2005 | Tohdo et al. ..................... 701/48 |
| 2005/0209771 A1 | | 9/2005 | Ishiguro |
| 2006/0235165 A1 | | 10/2006 | Kawanabe et al. |
| 2007/0256481 A1 | | 11/2007 | Nishiyama et al. |
| 2008/0100475 A1 | * | 5/2008 | Horstemeyer ................ 340/994 |
| 2009/0091439 A1 | | 4/2009 | Sekiyama et al. |
| 2010/0026476 A1 | | 2/2010 | Yamaoka et al. |
| 2010/0030420 A1 | | 2/2010 | Tauchi et al. |
| 2011/0140874 A1 | | 6/2011 | Tauchi et al. |

FOREIGN PATENT DOCUMENTS

| | | |
|---|---|---|
| JP | 11-272996 A | 10/1999 |
| JP | 2000-247162 | 9/2000 |
| JP | 2001-074764 | 3/2001 |
| JP | 2004-234418 | 8/2004 |
| JP | 2004-251786 | 9/2004 |
| JP | 2004-301546 A | 10/2004 |
| JP | 2004-325851 | 11/2004 |
| JP | 2005-009991 A | 1/2005 |
| JP | 2006-008820 | 1/2006 |
| JP | 2006-209455 A | 8/2006 |
| JP | 2006-243856 | 9/2006 |
| JP | 2006-275869 | 10/2006 |
| JP | 2007-284049 A | 11/2007 |
| JP | 2010-038647 | 2/2010 |
| WO | WO 00/07150 | 2/2000 |
| WO | WO 2006/054971 | 5/2006 |
| WO | WO 2008/026900 | 3/2008 |

OTHER PUBLICATIONS

International Preliminary Report on Patentability dated Nov. 2, 2010 for the corresponding International patent application No. PCT/JP2009/063711.

Office Action dated Oct. 16, 2012 issued in corresponding JP application No. 2008-200005 (and English translation).

Office Action dated Jun. 21, 2012 issued in co-pending U.S. Appl. No. 12/533,142.

Office Action dated Mar. 14, 2013 issued in co-pending U.S. Appl. No. 12/533,142.

Office Action dated Jan. 10, 2013 issued in co-pending U.S. Appl. No. 12/533,189.

Office Action dated Jul. 13, 2012 issued in co-pending U.S. Appl. No. 12/533,189.

Office Action dated Apr. 5, 2012 issued in co-pending U.S. Appl. No. 12/533,189.

Office Action dated Apr. 15, 2013 issued in co-pending U.S. Appl. No. 12/533,189.

Advisory Action dated Oct. 12, 2012 issued in co-pending U.S. Appl. No. 12/533,189.

Office Action dated Jan. 24, 2013 issued in corresponding DE application No. 11 2009 001 876.9 (and English translation).

Office Action dated Mar. 13, 2013 issued in corresponding CN application No. 200980128349.0 (English translation).

* cited by examiner

FIG. 6

| DIAGNOSIS ITEM | PREVIOUS DIAGNOSIS RESULT | LATEST DIAGNOSIS RESULT |
|---|---|---|
| ECO-MODE TRAVEL RATIO | [ADVIECOMD (n-1)] | [ADVIECOMD (n)] |
| ECO-LAMP TURN ON RATIO | [ADVIECOIND (n-1)] | [ADVIECOIND (n)] |
| SPECIFIC MODE SELECT RATIO | [ADVIMODE (n-1)] | [ADVIMODE (n)] |
| ACCELERATOR OVER-DEPRESS RATIO | [ADVIACC (n-1)] | [ADVIACC (n)] |
| INADEQUATE GEAR SELECT RATIO | [ADVIGEAR (n-1)] | [ADVIGEAR (n)] |

FIG. 9

| | |
|---|---|
| USER NAME : MR. TOYOTA | REAL TIME DRIVING DIAGNOSIS |
| ● PRESENT STATUS/RANK | ● THIS MONTH ACCUMULATIVE POINT |
| Blue / 1 | 1,500 Pt |
| ● ECO LEVEL | ● UPDATE TIME |
| Excellent | 2008/7/30 13:45 |
| ● FUEL CONSUMPTION | |
| 10.2 Km/L | |
| ● ADVICE | |
| GENTLE ACCELERATOR OPERATION WILL CAUSE··· | |
| TO THE PREVIOUS | TO THE NEXT |

FIG. 10

| | ADVICE |
|---|---|
| ADVICE ID | FUEL EFFICIENCY IMPROVES BY AVOIDING TO DEPRESS ON ACCELERATOR TO THE FLOOR |
| ADVICE ID | FUEL EFFICIENCY BECOMES LOWER BY RAPID ACCELERATION AND SUDDEN STARTING |
| ADVICE ID | KEEP A SAFE DISTANCE TO AVOID SUDDEN BRAKING |
| ADVICE ID | NAVIGATION OR TRAFFIC INFO. HELPS SMOOTH DRIVING |
| ADVICE ID | FUEL EFFICIENCY IMPROVES BY MAINTAINING TIRE PRESSURE AT A RIGHT VALUE |
| ADVICE ID | FUEL EFFICIENCY BECOMES LOW BY HEAVY LOAD |
| ADVICE ID | IDLING CAUSES FUEL EFFICIENCY TO BE LOW |
| ADVICE ID | ECOLOGICAL DRIVING LEADS TO SAFETY |
| ADVICE ID | FUEL EFFICIENCY IMPROVES BY MAINTAINING TIRE PRESSURE AT A RIGHT VALUE |

DRIVING DIAGNOSIS INFORMATION PROVIDING APPARATUS AND SYSTEM

CROSS-REFERENCE TO RELATED APPLICATIONS

The present application is a U.S. national stage application of PCT/JP2009/063711 filed on Jul. 27, 2009 and is based on Japanese Patent Application No. 2008-200005 filed on Aug. 1, 2008, the disclosure of which is incorporated herein by reference.

TECHNICAL FIELD

The present invention relates to an apparatus and a system for providing a driver with a result of diagnosis regarding a driving state of a vehicle.

BACKGROUND ART

In recent years, environmental problems including pollution and global warming have become a big issue. A major issue for vehicles is, for example, the reduction of exhaust gas, in particular, $CO_2$.

In another aspect, because of a rise in traffic accidents, vehicle safety has also become a major issue. Reflecting the above issues, an intelligent or high-functional vehicle has been developed for improvement of safety related performance and environment related performance (e.g., fuel efficiency), attaining some progress.

The fuel efficiency is expected to be improved and the exhaust gas is expected to be consequently reduced when drivers are eager to drive vehicles economically. Also, the traffic accidents are expected to be reduced when drivers are eager to drive vehicles safely. The Improvement of driving acts of drivers is hence a very important theme. Then, making a diagnosis regarding a driving state of a driver and notifying a driver of a result of the diagnosis can be considered for the improvement of driving acts.

For example, JP-H11-272996A describes a warning system where vehicle traveling data is transmitted to an information center, and a diagnosis of driving is made in the information center, and warning information is notified to the driver based on the diagnosis of driving.

According to the warning system disclosed in JP-H11-272996A, however, successive notifications of similar warning information may bore a driver and reduce the merit of warning. Further, unless a situation requires the warning, the warning information is not notified. The usefulness or merit associated with making the diagnosis of driving is low.

DISCLOSURE OF THE INVENTION

In view of the above and other difficulties, it is an objective of the present invention to provide a driving diagnosis information providing apparatus and a driving diagnosis information providing system.

According to a first aspect of the present invention, a driving diagnosis information providing apparatus for a vehicle is provided. The driving diagnosis information providing apparatus includes a vehicle information acquisition section, a diagnosis section, a useful information acquisition section, and a notification section. The vehicle information acquisition section acquires vehicle information indicative of a vehicle state. The diagnosis section makes a diagnosis of a driving state of the vehicle based on the vehicle information acquired by the vehicle information acquisition section. The useful information acquisition section acquires, as useful information, at least one of announce information and helpful information. The announce information includes information to be reported to a driver of the vehicle. The helpful information includes information helpful for driving. The notification section notifies the driver of diagnosis information indicative of a result of the diagnosis made by the diagnosis section, and notifies the driver of the useful information in place of the diagnosis information under a predetermined condition.

According to a second aspect of the present invention, a driving diagnosis information providing system is provided. The driving diagnosis information providing system includes an in-vehicle apparatus that is equipped in a vehicle; and a server that is communicatable with the in-vehicle apparatus. The sever includes a useful information storing part that stores therein announce information and helpful information. The announce information includes information to be reported to a driver. The helpful information includes information helpful for driving. The in-vehicle apparatus includes a vehicle information acquisition section, a diagnosis section, a useful information acquisition section and a notification section. The vehicle information acquisition section acquires vehicle information indicative of a vehicle state. The diagnosis section makes a diagnosis of a driving state of the vehicle based on the vehicle information acquired by the vehicle information acquisition section. The useful information acquisition section acquires at least one of the announce information and the helpful information from the server. The notification section notifies a driver of diagnosis information indicative of a result of the diagnosis made by the diagnosis section, and notifies the driver of the acquired one of the announce information and the helpful information in place of the diagnosis information under a predetermined condition.

According to the above driving diagnosis information providing apparatus and system, since it is possible to notify the driver of the announce information and the helpful information in addition to the diagnosis information, it is possible to prevent the driver from being bored and provide joy to the driver. Further, since it is possible to notify various information in an un-monotonous manner, it is possible to prevent the driver from getting used to the notifications and from not taking care of the diagnosis information. It is therefore possible to maintain merits of the notification of the diagnosis information for a long period of time.

BRIEF DESCRIPTION OF THE DRAWINGS

The above and other objects, features and advantages of the present invention will become more apparent from the following detailed description made with reference to the accompanying drawings. In the drawings:

FIG. 6 is a diagram illustrating items for diagnosis in accordance with one embodiment;

FIG. 9 is a diagram illustrating one exemplary display in accordance with one embodiment; and FIG. 10 is a diagram illustrating some advice in accordance with one embodiment.

EXEMPLARY EMBODIMENTS FOR CARRYING OUT THE INVENTION

Exemplary embodiments are described below with reference to the accompanying drawings.

Figure 1:
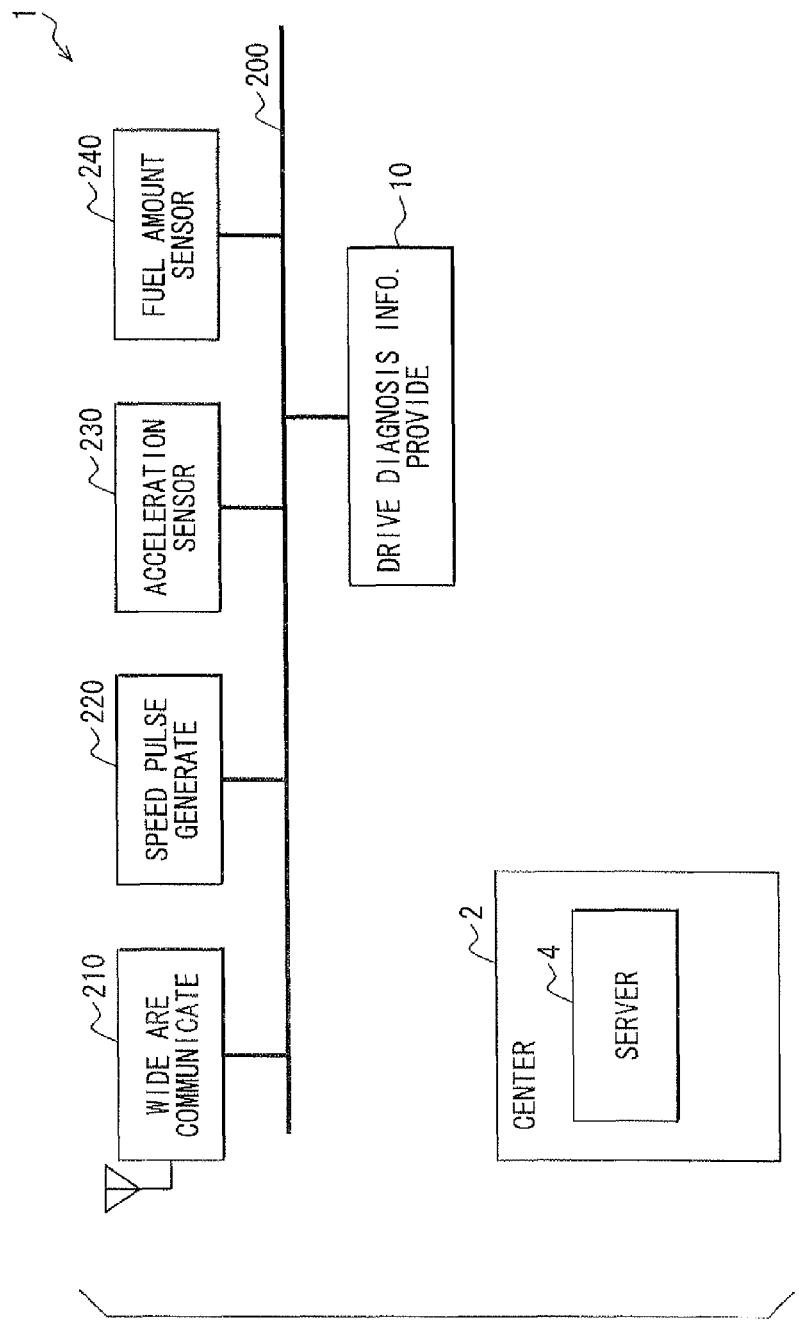
FIG. 1 is diagram illustrating a driving diagnosis information providing system in accordance with one embodiment.

FIG. 1 illustrates a driving diagnosis information providing system 1 according to one embodiment. The driving diagnosis information providing system 1 includes a driving diagnosis information providing apparatus 10 equipped in a vehicle (not shown) and a server 4 located in a center 2.

The driving diagnosis information providing apparatus 10 is connected with an in-vehicle LAN 200. The in-vehicle LAN 200 is connected with, for example, a wide area communication device 210, a vehicle speed pulse generator 220, an acceleration sensor 230, a fuel amount detection sensor 240 and the like. The foregoing sensors are merely examples connected with the in-vehicle LAN 200. A variety of sensors for detecting a vehicle state may be connected with the in-vehicle LAN 200.

The wide area communication device 210 and the server 4 are communicatable with each other. For example, the wide area communication device 210 may transmit vehicle information, user information and the like to VICS (Vehicle information and Communication System) center, and may receive traffic information, which is accident information or traffic jam information for instance, from the VICS center. The above information transmission and reception may be made via radio beacon or infrared beacon for VICS service, the beacons being located close to a road.

The vehicle speed pulse generator 220 generates a pulse signal that depends on a vehicle speed. The acceleration sensor 230 outputs a signal that depends on acceleration of the vehicle. A fuel amount detection sensor 240 outputs a signal that depends on an amount of fuel in a fuel tank.

Figure 2:
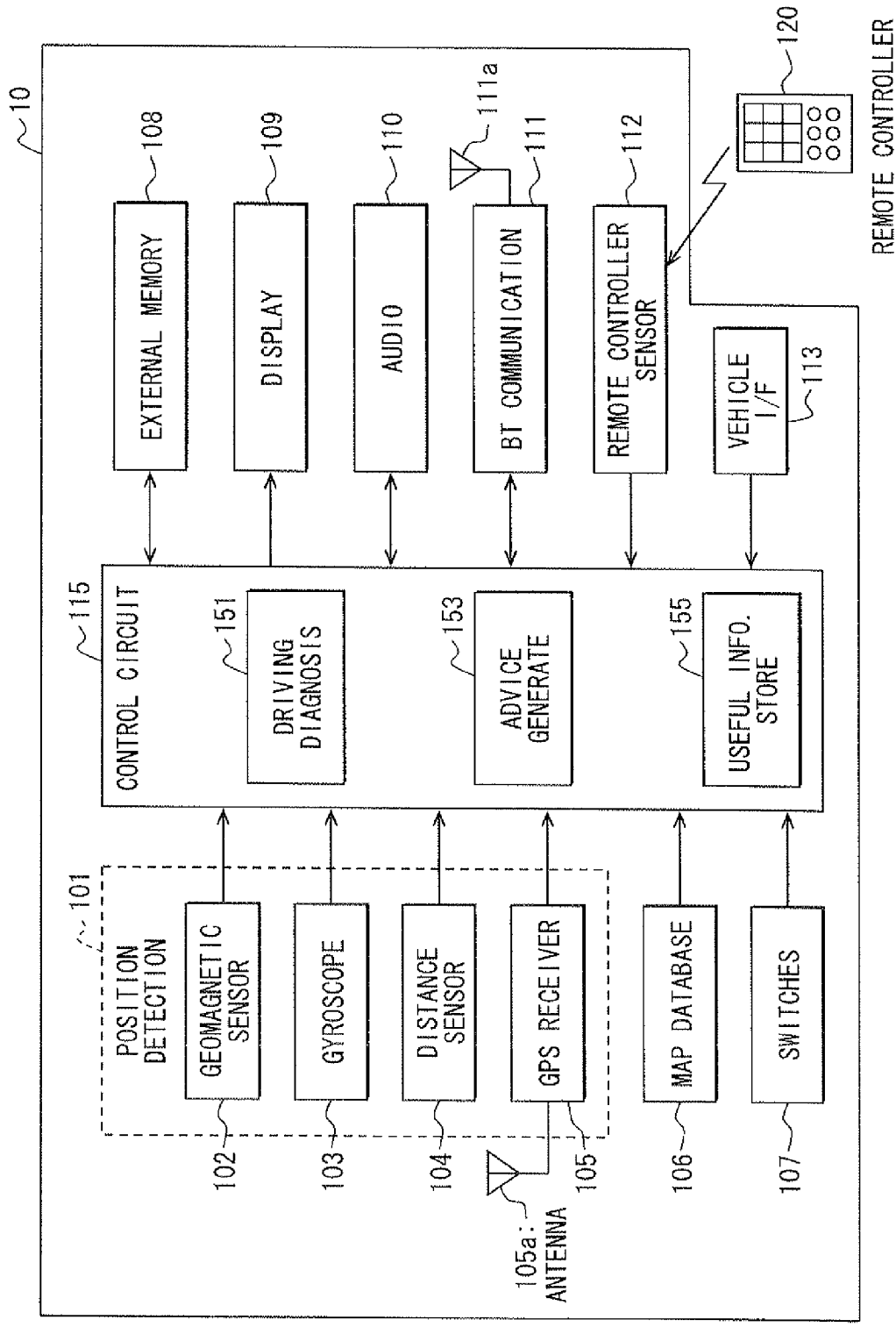
FIG. 2 is a block diagram illustrating a driving diagnosis information providing apparatus in accordance with one embodiment.

FIG. 2 is a block diagram illustrating a driving diagnosis information providing apparatus 10 according to one embodiment. The driving diagnosis information providing apparatus 10 includes a location detection device 101, a map database 106, a group of control switches 107, an external memory 108, a display device 109, an audio-guidance/speech-recognition device 110, a Bluetooth (BT) communication device 111, a remote controller sensor 112, a vehicle interface (referred to also as I/F) 113, and a control circuit 115 that can collaborative-control the foregoing components.

The location detection device 101 includes a group of sensors for detecting a present location and a present orientation (e.g., heading direction) of a vehicle equipped with the subject driving diagnosis information providing apparatus 10. The location detection device 101 includes a geomagnetic sensor 102, a gyroscope 103, a distance sensor 104, and a GPS receiver.

The GPS receiver 105 receives a radio wave transmitted from satellites for Global Positioning System (GPS) via a GPS antenna 105a to detect a location, an orientation (e.g., heading direction) and a speed etc. of the vehicle.

The geomagnetic sensor 102 is, for example, a semiconductor orientation sensor, and senses a geomagnetic field, which extends between the north and the south of the earth, to detect the orientation (e.g., heading direction) of the vehicle. The gyroscope 103 senses an angular velocity and an orientation change of the vehicle, and outputs a detection signal that depends on an angular velocity related to rotation of the vehicle.

The distance sensor 104 detects a traveling distance of the vehicle based on an acceleration of the vehicle along a vehicle front-rear direction and the like. Because the sensors have respective errors whose properties are different, multiple sensors are used while being complemented each other.

The map database 106 stores map data. The map data includes link data indicative of roads, node data indicative of intersections, data for so called map matching used to improve position locating accuracy, mark data indicative of facilities, image data for display, audio data for audio guidance, and the like.

The group of control switches 107 is integrated with the display device 109. The group of control switches 107 includes an input operation panel. The input operation panel has a touch sensitive panel provided on a display screen of the display device 107 and a mechanical button switch located on a periphery of the display screen. The touch sensitive panel and the display screen are integrated so as to form a multilayer structure. As the touch sensitive panel, it is possible to employ various types of touch sensitive panel including a pressure sensitive type, an electromagnetic induction type, a capacitive type, and the like.

The external memory 108 stores therein a variety of programs executed by the control circuit 115, a computational result provided from the control circuit 115, and the like. The display device 109 includes a liquid crystal color display device that can display a button on the display screen when the display device 109 functions as the touch sensitive panel in cooperation with the group of control switches 107. The liquid crystal color display device also can display a result of diagnosis regarding a driving state, a map, a retrieved route, a TV program, a DVD video, and the like.

The audio-guidance/speech-recognition device 110 provides audio guidance by outputting speech for route guidance. The audio-guidance/speech-recognition device 110 coverts user speech captured by a microphone (not shown) into an electric signal, and crosschecks the user speech with vocabulary data or comparison patterns in a recognition dictionary stored in the audio-guidance/speech-recognition device 110, and outputs a recognition result to the control circuit 115. The recognition result may indicate a pattern that has the highest degree of coincidence in the crosschecking.

The BT communication device 111 can wirelessly communicate with peripheral devices by utilizing a Bluetooth function. The remote controller sensor 112 receives a wireless signal such as an infrared signal, a radio signal and the like from a remote controller 120, which can be manipulated by a user. The remote controller sensor 112 inputs information associated with the received wireless signal to the control circuit 115. A user can remotely operate the driving diagnosis information providing apparatus 10 by manipulating the remote controller 120, as the user can operate the driving diagnosis information providing apparatus 10 by manipulating the group of control switches 107.

The vehicle I/F 113 receives signals from various sensors equipped in the vehicle and inputs signals to the control circuit 115. The various sensors include, for example, the vehicle speed pulse generator 220, the acceleration sensor 230, the fuel amount detection sensor 240 and the like, as shown in FIG. 1. The vehicle may be equipped with other sensors which are, for example, accelerator sensor, a throttle angle sensor, a brake sensor, a steering angle sensor, an inter-vehicle distance sensor, an image sensor, an indicator sensor, an illuminance sensor and the like.

The control circuit 115 includes a driving diagnosis part 151, advice generation part 153, and a useful information storing part 155. The driving diagnosis part 151 receives signals from, for example, the vehicle speed pulse generator 220, the acceleration sensor 230, the fuel amount detection sensor 240 and the like via the vehicle I/F 113 to acquire information about a driving state of the vehicle, and makes a diagnosis of the driving state. A time of acquiring the information about the driving state is calculated based on time data contained in the signal transmitted from the GPS satellite. In one embodiment, a predetermined traveling zone is used as a unit zone for making a diagnosis of driving, which will be more specifically described later.

The advice generation part 153 generates advice to be provide to a driver, based on a result of the diagnosis of the driving state made by the driving diagnosis part 151. The useful information storing part 155 can store therein a variety of announce information and a variety of "a word of advice" received or downloaded from the server 4 via the wide area communication device 210.

The announce information includes, for example, information that should be or is desired to be reported to a user. The announce information is, for example, accident information, traffic jam information, advertising information, or the like.

The word of advice includes, for example, information that should be or is desired to be reported to a user. The word of advice may include, for example, information which is associated with so called bits of knowledge about driving and which is helpful for driving. The word of advice may be also referred to as helpful information. The announce information and the word of advice respectively contain information including an expiration date or time of the information.

In the followings, the announce information and the word of advice is also called useful information.

Figure 3:
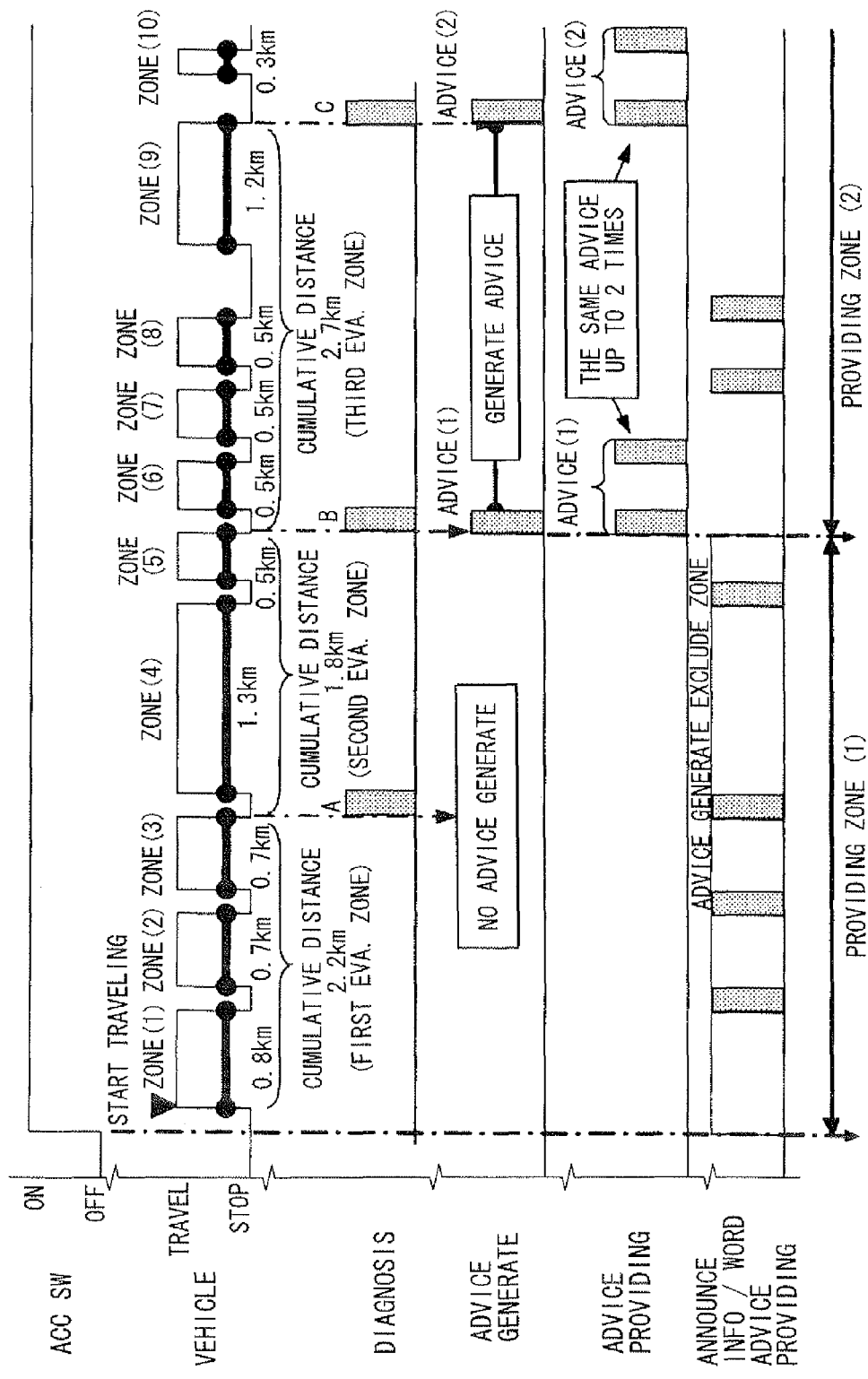
FIG. 3 is a timing chart illustrating timing of generating advice, timing of providing advice, and timing of providing useful information in a first exemplary case in accordance with one embodiment.
Figure 4:
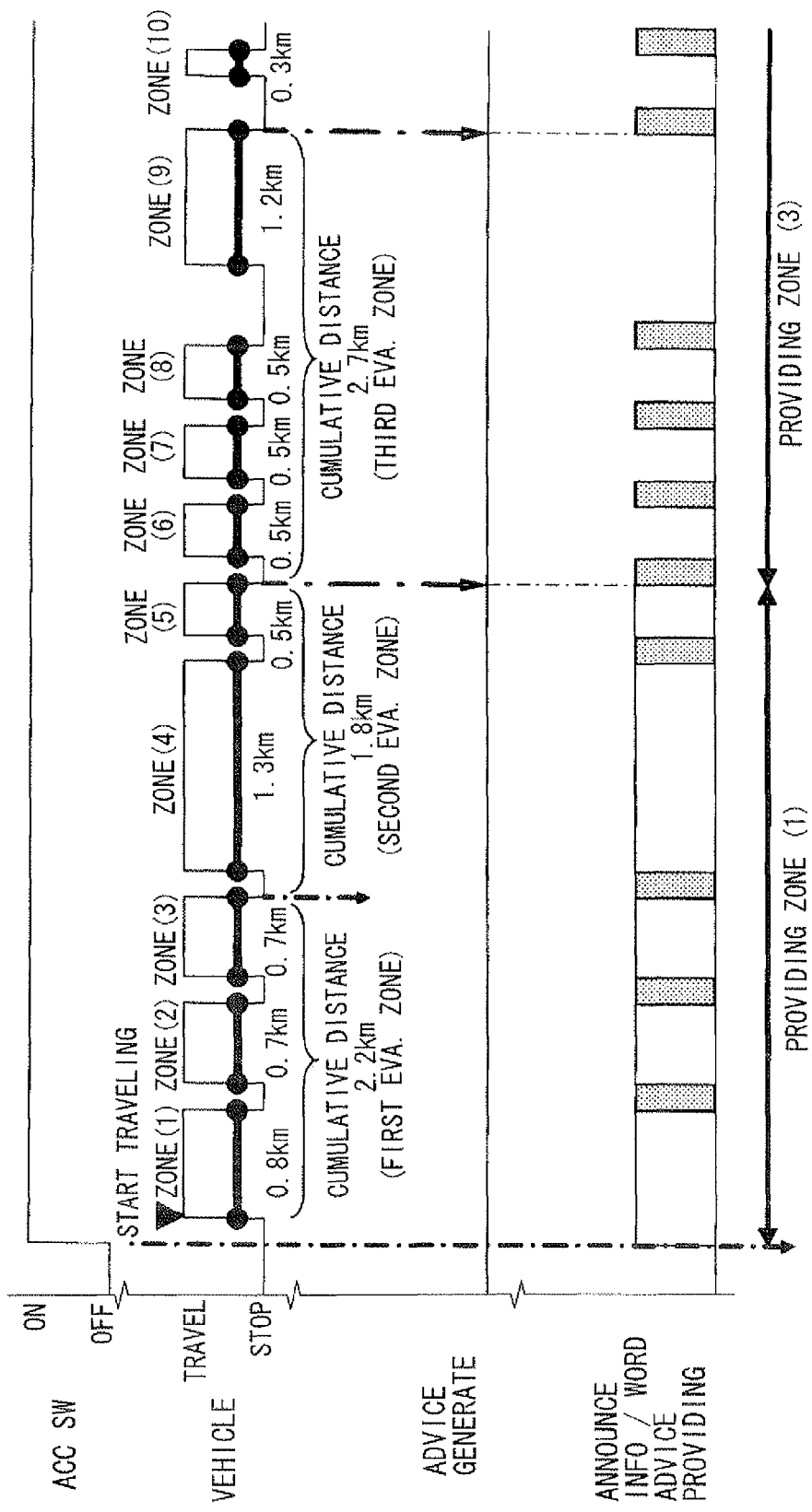
FIG. 4 a timing chart illustrating timing of generating advice, timing of providing advice, and timing of providing useful information in a second exemplary case in accordance with one embodiment.

FIGS. 3 and 4 are timing charts each illustrating timing of generating and providing advice, and timing of providing useful information.

In FIG. 3, the first line from the top represents an ON state and an OFF state of an accessory (ACC) switch of a vehicle according to an exemplary case. The second line represents a traveling state and a stopping state of the vehicle. The zones (1) to (10) represent zones where the vehicle is in the traveling state, in other words, zones where the vehicle speed is larger than 0 km/h. Any other zones except the zones (1) to (10) represent zones where the vehicle is in the stopping state, in other words, zones where the vehicle speed is 0 km/h. Note that figure with each zone denotes a traveling distance in the zone.

The third line from the top in FIG. 3 represents timing of making a diagnosis of the driving state. In one embodiment, a predetermined traveling zone is used as a unit zone for making a diagnosis. For example, the unit zone may be such that the starting point of the unit zone is a point where a cumulative traveling distance of the vehicle in the unit zone is 0 km, and the end point of the unit zone is a point where the vehicle stops for the first time after the cumulative traveling distance exceeds 1.6 km in the unit zone. In the followings, the unit zone is also referred to as an evaluation zone or a traveling zone. According to statistical studies, a cumulative traveling distance of 1.6 km is an average traveling distance when users go on drive with so called sense of short driving or sense of short distance.

In an exemplary case illustrated in FIG. 3, the point where the vehicle starts traveling for the first time after the accessory switch is switched on becomes a starting point of an evaluation zone, which corresponds to a starting point of the zone (1). At an end point of the zone (1), the cumulative traveling distance is 0.8 km and does not satisfy a condition that the cumulative traveling distance is 1.6 km or more. Thus, the end point of the zone (1) cannot be the end point of the evaluation zone. Similarly, at an end point of the zone (2), the cumulative traveling distance is 1.5 km and does not satisfy the condition, and thus, the end point of the zone (2) cannot be the end point of the evaluation zone. At an end point of the zone (3), the cumulative traveling distance is 2.2 km and satisfies the condition that the cumulative traveling distance is 1.6 km or more. In other words, the end point of the zone (3) is the point where the vehicle stops for the first time after the cumulative distance exceeds 1.6 km. Thus, the end point of the zone (3) becomes the end point of the evaluation zone. A zone between the starting point of the zone (1) and the end point of the zone (3) becomes the evaluation zone for the first time after the ACC switch is switched on, and acts as a first evaluation zone or a first traveling zone. A diagnosis is made regarding the first evaluation zone. A time of making the diagnosis is the end point of the first evaluation zone, in other words, the end point of the zone (3). This time may be also referred to as a diagnosis time A.

The evaluation zone after the first evaluation zone is between the end point of the zone (3) and the end point of the zone (5), and acts as a second evaluation zone or a second traveling zone. A time of making a diagnosis regarding the second evaluation zone is the end point of the second evaluation zone, in other words, the end point of the zone (5). This time may be also referred to as a diagnosis time B.

The evaluation zone after the second evaluation zone is between the end point of the zone (5) and the end point of the zone (9), and acts as a third evaluation zone. A time of making a diagnosis regarding the third evaluation zone is the end point of the third evaluation zone, in other words, the end point of the zone (9). This time may be also referred to as a diagnosis time C.

The fourth line from the top in FIG. 3 represents timing of generating advice. The timing of generating advice corresponds to timing of performing an advice generation procedure. In the advice generation procedure: a comparison is made between a result of the diagnosis regarding the latest evaluation zone and that regarding the previous evaluation zone; a relative evaluation is made on the result of the diagnosis regarding the latest evaluation zone; and advice is made base on a result of the relative evaluation. According to the above advice generation procedure, at the end point of the first evaluation zone corresponding to the diagnosis time A, the result of diagnosis regarding the previous evaluation zone does not exist, and hence, the advice is not generated.

At the end point of the second evaluation zone corresponding to the diagnosis time B, a comparison is made between a result of diagnosis regarding the first evaluation zone and that regarding the second evaluation zone, and a relative evaluation is made on the result of the diagnosis regarding the second evaluation zone, and advice is generated. At the end point of the third evaluation zone corresponding to the diagnosis time C, a comparison is made between the a result of diagnosis regarding the second evaluation zone and that regarding the third evaluation zone, and a relative evaluation on the result of diagnosis regarding the third evaluation zone is made, and advice is generated.

The fifth line from the top in FIG. 3 represents timing of providing advice. In synchronization with the timing of generating advice, advice is provided when the vehicle makes a stop. When the vehicle makes a stop again in the same evaluation zone, the same advice is provided. The same advice is provided up to two times. That is, the same advice is provided each time the vehicle make a stop, until the number of times the same advice is provided reaches two times.

The sixth line from the top in FIG. 3 represents timing of providing useful information including the announce information or the word of advice according to an exemplary case. The useful information is provided when the vehicle makes a stop in a providing zone (1) where the advice is not generated. As shown in FIG. 3, the providing zone (1) is for example a sum of the first evaluation zone and the second evaluation zone for instance. The useful information is also provided when the vehicle makes a stop for the third or grater time in a providing zone (2) where the advice is generated. The providing zone (2) is the third evaluation zone for instance. When the vehicle makes a stop for the first or second time in the providing zone (2), the advice is provided, as described above.

Explanation is given below on FIG. 4. The first and second lines from the top in FIG. 4 represent the same as those in FIG. 3. The third line in FIG. 4 represents the timing of providing advice. As seen, FIG. 4 illustrates an exemplary case where the advice is not generated due to some reason.

The fourth line in FIG. 4 represents timing of providing useful information. When no advice is generated, the useful information is provided at the end point of the evaluation zone (e.g., the end points of the second and third evaluation zones) where the advice should have been generated. The useful information is provided each time the vehicle makes a stop in the same evaluation zone. Such zone is also referred to as a providing zone (3).

Figure 5:
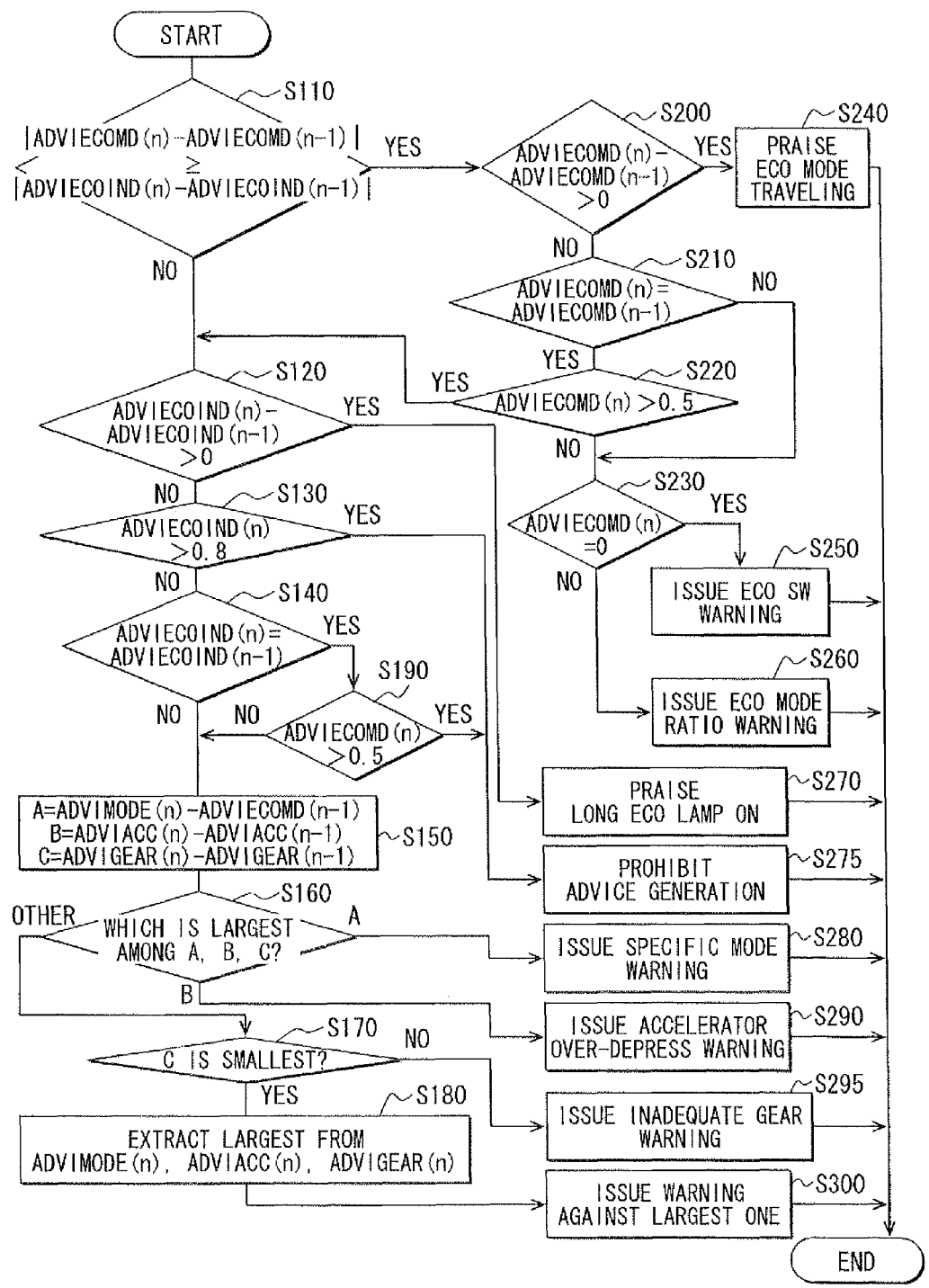
FIG. 5 is a flowchart illustrating an advice generation procedure in accordance with one embodiment.

FIG. 5 is a flowchart illustrating an advice generation procedure, which the advice generation part 153 of the control circuit 115 executes to generate advice for diagnosis items, examples of which are illustrated in FIG. 6.

As shown in FIG. 6, the diagnosis items include an eco-mode travel ratio, an eco-lamp turn on ratio, specific mode selection ratio, an accelerator over-depressing ratio, and an inadequate gear selection ratio. The eco-mode is, for example, a fuel-efficient mode where the fuel economy is improved compared to a normal mod. For example, operation of an air conditioner is suppressed compared to the normal mode, or a fuel injection amount against a depressing amount of the accelerator pedal is suppressed compared to the normal mode. By depressing an eco-switch (not shown), a mode of the vehicle can be switched into the eco-mode. The eco-lamp is, for example, a lamp that is turned on when a traveling state of the vehicle is in an economical state, which is low fuel consumption state for instance.

In the diagnosis regarding the eco-mode travel ratio, the driving diagnosis part 151 of the control circuit 115 diagnoses a ratio of "a traveling distance of the vehicle in the eco-mode" to "a predetermined traveling distance corresponding to a predetermined traveling zone", and thereby provides a diagnosis result "ADVIECOMD".

In the diagnosis regarding the eco-lamp turn on ratio, the driving diagnosis part 151 diagnoses a ratio of "a traveling distance of the vehicle with the eco-lamp being turned on" to "a predetermined traveling distance corresponding to a predetermined traveling zone", and thereby provides a diagnosis result "ADVIECOIND".

In the diagnosis regarding the specific mode selection ratio, the driving diagnosis part 151 diagnoses a ratio of "a traveling distance of the vehicle with a traveling mode being set to a specific mode (e.g., sports mode, power mode)" to "a predetermined traveling distance corresponding to a predetermined traveling zone", and thereby provides a diagnosis result "ADVIMODE". In the sports mode or the power mode, emphasis is placed on traveling performance. For example, response performance of accelerator pedal operation and bake pedal operation is improved, or acceleration performance is improved.

In the diagnosis regarding the accelerator over-depressing ratio, the driving diagnosis part 151 diagnoses a ratio of "a traveling distance of the vehicle with the depressing amount of the accelerator pedal exceeding a threshold" to "a predetermined traveling distance corresponding to a predetermined traveling zone", and thereby provides a diagnosis result "ADVIACC".

In the diagnosis regarding the inadequate gear selection ratio, the driving diagnosis part 151 diagnoses a ratio of "a traveling distance of the vehicle with the selected gear or shift un-matching a torque characteristic of an engine" to "a predetermined traveling distance corresponding to a predetermined traveling zone", and thereby provides "ADVIGEAR".

In FIG. 6, "(n)" indicates that the diagnosis result is one in the latest evaluation zone, and "(n−1)" indicates that the diagnosis result is another one the previous evaluation zone, which may be the evaluation zone one zone before the latest evaluation zone.

The description returns to the explanation on the advice generation procedure illustrated in FIG. 5. At S110, it is determined whether an absolute value of an eco-mode variation "ADVIECOMD(n)-ADVIEDCOMD(n−1)" is grater than or equal to an absolute value of an eco-lamp variation "ADVIECOIND(n)-ADVIECOIND(n−1)". The eco-mode variation is the eco-mode traveling ratio in the previous diagnosis subtracted from that in the latest diagnosis, in other words, an amount of change between the eco-mode traveling ratio in the latest diagnosis and that in the previous diagnosis. The eco-lamp variation is the eco-lamp turn on ratio in the previous diagnosis subtracted from that in the latest diagnosis, in other words, an amount of change between the eco-lamp turn on ratio in the latest diagnosis and that in the previous diagnosis. When it is determined that the eco-mode variation is not grater than or equal to the eco-lamp variation, corresponding to "NO" at S110, the process proceeds to S120.

At S120, it is determined whether the eco-lamp variation "ADVIECOIND(n)-ADVIECOIND(n−1)" is larger than zero. When the eco-lamp variation is not larger than zero, corresponding to "NO" at S120, the process proceeds to S130. At S130, it is determined whether the eco-lamp turn on ratio in the latest diagnosis "ADVIECOIND(n)" is larger than 0.8. When the eco-lamp turn on ratio in the latest diagnosis is less than or equal to 0.8, corresponding to "NO" at S130, the process proceeds to S140.

At S140, it is determined whether the eco-lamp turn on ratio in the latest diagnosis "ADVIECOIND(n)" is equal to that in the previous diagnosis "ADVIECOIND(n−1)", in other words, whether the eco-lamp variation is 0. When the eco-lamp turn on ratio in the latest diagnosis is not equal to that in the previous diagnosis, corresponding to "NO" at S140, the process proceeds to S150.

When the eco-lamp turn on ratio in the latest diagnosis is equal to that in the previous diagnosis, corresponding to "YES" at S140, the process proceeds to S190. At S190, it is determined whether the eco-lamp turn on ratio in the latest diagnosis "ADVIECOMD(n)" is larger than 0.5. When the eco-lamp turn on ratio in the latest diagnosis is less than or equal to 0.5, corresponding to "NO" at S190, the process proceeds to S150.

At S150, a specific mode variation "A=ADVIMODE(n)-ADVIMODE(n−1)" is computed. The specific mode variation is the specific mode selection ratio in the previous diagnosis subtracted from that in the latest diagnosis, in other words, an amount of change between the specific mode selection ratio in the latest diagnosis and that in the previous diagnosis.

Further, at S150, an accelerator over-depressing variation "B=ADVIACC(n)-ADVIACC(n−1)" is computed. The accelerator over-depressing variation is the accelerator over-depressing ratio in the previous diagnosis subtracted from that in the latest diagnosis, in other words, an amount of change between the accelerator over-depressing ratio in the latest diagnosis and that in the previous diagnosis.

Further, at S150, an inadequate gear variation "C=ADVIGEAR(n)-ADVIGEAR (n−1)" is computed. The inadequate gear variation is the inadequate gear selection ratio in the previous diagnosis subtracted from that in the latest diagnosis, in other words, an amount of change between the inadequate gear selection ratio in the latest diagnosis and that in the previous diagnosis.

After S150, the process proceeds to S160. At S160, it is determined which is largest among the specific mode variation "A", the accelerator over-depressing variation "B" and the inadequate gear variation "C". When it is determined at S160 that the specific mode variation "A" is largest, the process proceeds to S280 where warning against the specific mode is issued. For example, advice indicating that the driving using the specific mode should be reduced is generated, and the advice is displayed on a screen of the display device 109.

When it is determined at S160 that the accelerator over-depressing variation "B" is largest, the process proceeds to S290 where the warning against the over-depressing of the accelerator is issued. For example, advice indicating that an attention should be paid to the over-depressing of the accelerator is generated and displayed on the screen of the display screen 109.

When it is determined at S160 that neither the specific mode variation nor the inadequate gear variation is not largest, the process proceeds to S170. It should be noted that the process also proceeds to S170 when it is determined at S160 that both of the specific mode variation "A" and the inadequate gear ratio "C" are largest and equal to each other.

At S170, it is determined whether the inadequate gear variation "C" is smallest. When the inadequate gear variation is not smallest but largest, the process proceeds to S295 where the warning against the selecting of an inadequate gear is issued. For example, advice indicating that a proper gear or shift should be selected is generated and displayed on the screen of the display device 109.

When it is determined at S170 that the inadequate gear variation is smallest, corresponding to "YES" at S170, the process proceeds to S180. At S180, the largest one is extracted from among the specific mode variation, the accelerator over-depressing variation and the inadequate gear variation. In the above, the process proceeds to S180 when the specific mode variation and the accelerator over-depressing variation are equal and are largest. In such a case, both of the specific mode variation and the accelerator over-depressing variation are extracted at S180.

After the S180, the process proceeds to S300 where the warning regarding the specific mode variation and the accelerator over-depressing variation is issued. For example, at S300, the process similar to S280 and S290 may be performed. When it is determined at S110 that the eco-mode variation is greater than or equal to the eco-lamp variation, corresponding to "YES" at S110, the process proceeds to S220.

At S200, it is determined whether the eco-mode variation "ADVIECOMD(n)-ADVIECOMD(n−1)" is larger than zero. When the eco-mode variation is larger than zero, corresponding to "YES" at S200, the process proceeds to S240. At S240, advice for praising a large eco-mode travel ratio or for praising an economic driving state is generated and displayed on the screen of the display device 109.

When it is determined at S200 that the eco-mode variation is less than or equal to zero, corresponding to "NO" at S200 and the worse of the eco-mode traveling ratio, the process proceeds to S210. At S210, it is determined whether the eco-mode traveling ratio in the latest diagnosis is equal to that in the previous diagnosis, in other words, it is determined whether the eco-mode variation "ADVIECOMD(n)-ADVIECOMD(n−1)" is zero. When the eco-mode variation is zero, corresponding to "NO" at S210, the process proceeds to S230.

When it is determined at S210 that the eco-mode traveling ratio in the latest diagnosis "ADVIECOMD(n)" is equal to that in the previous diagnosis "ADVIECOMD(n−1)", corresponding to "YES" at S210, the process proceeds to S220. At S220, it is determined whether the eco-mode traveling ratio in the latest diagnosis "ADVIECOMD(n)" is larger than 0.5. When the eco-mode traveling ratio in the latest diagnosis is larger than 0.5, corresponding to "YES" at S220, the process returns to S120.

When it is determined at S220 that the eco-mode traveling ratio in the latest diagnosis is less than or equal to 0.5, corresponding to "NO" at S220, the process proceeds to S230. At S230, it is determined whether the eco-mode traveling ratio in the latest diagnosis "ADVIECOMD(n) is zero. When the eco-mode traveling ratio in the latest diagnosis is zero, corresponding to "YES" at S230, the process proceeds to S250. At S250, the warning against the eco switch being OFF is issued. For example, advice indicating that the eco switch is OFF is generated and displayed on the screen of the display device 109.

When it is determined at S230 that the eco-mode traveling ratio in the latest diagnosis is not zero, corresponding to "NO" at S230, the process proceeds to S260. At S260, the warning regarding the eco-mode traveling ratio is issued. For example, advice indicating that the eco-mode traveling ratio is small is generated and displayed on the screen of the display device 109.

When it is determined at S120 that the eco-lamp variation is larger than zero, corresponding to "YES" at S120, the process proceeds to S270. At S270, advice for praising achievement that a period of turning on the eco lamp on becomes longer is generated and displayed on the screen of the display device 109.

When it is determined at S130 that the eco-lamp turn on ratio is larger than 0.8, corresponding to "YES" at S130, no advice is generated. When it is determined at S190 that the eco-lamp turn on ratio is larger than 0.5, corresponding to "YES" at S190, no advice is generated.

Figure 7:
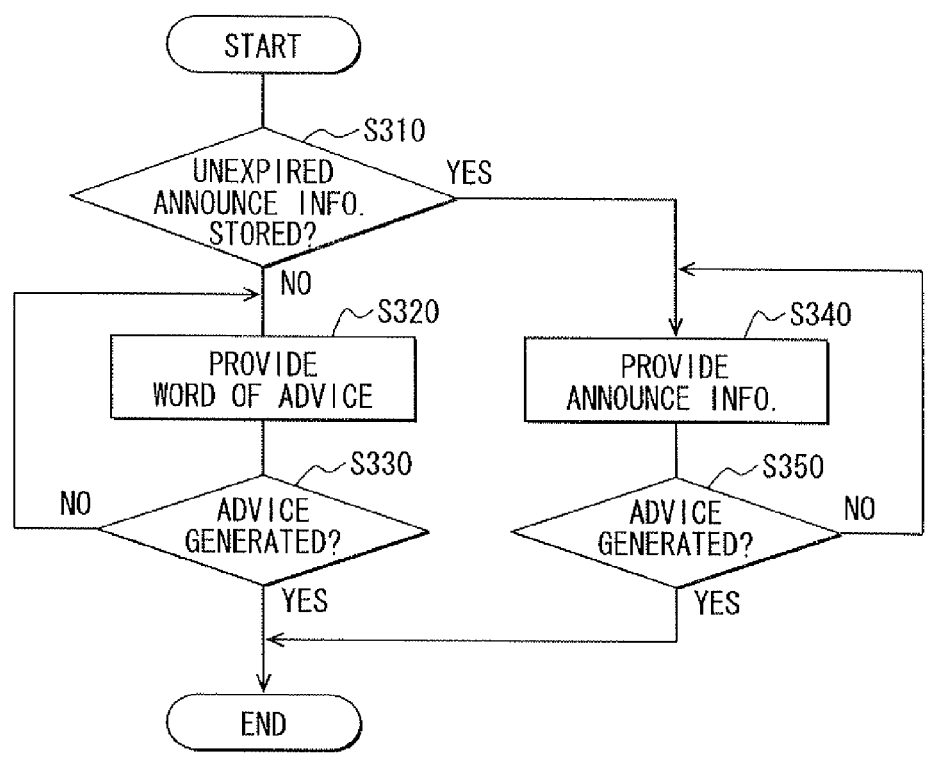
FIG. 7 is a flowchart illustrating a first useful information providing procedure in accordance with one embodiment.
Figure 8:
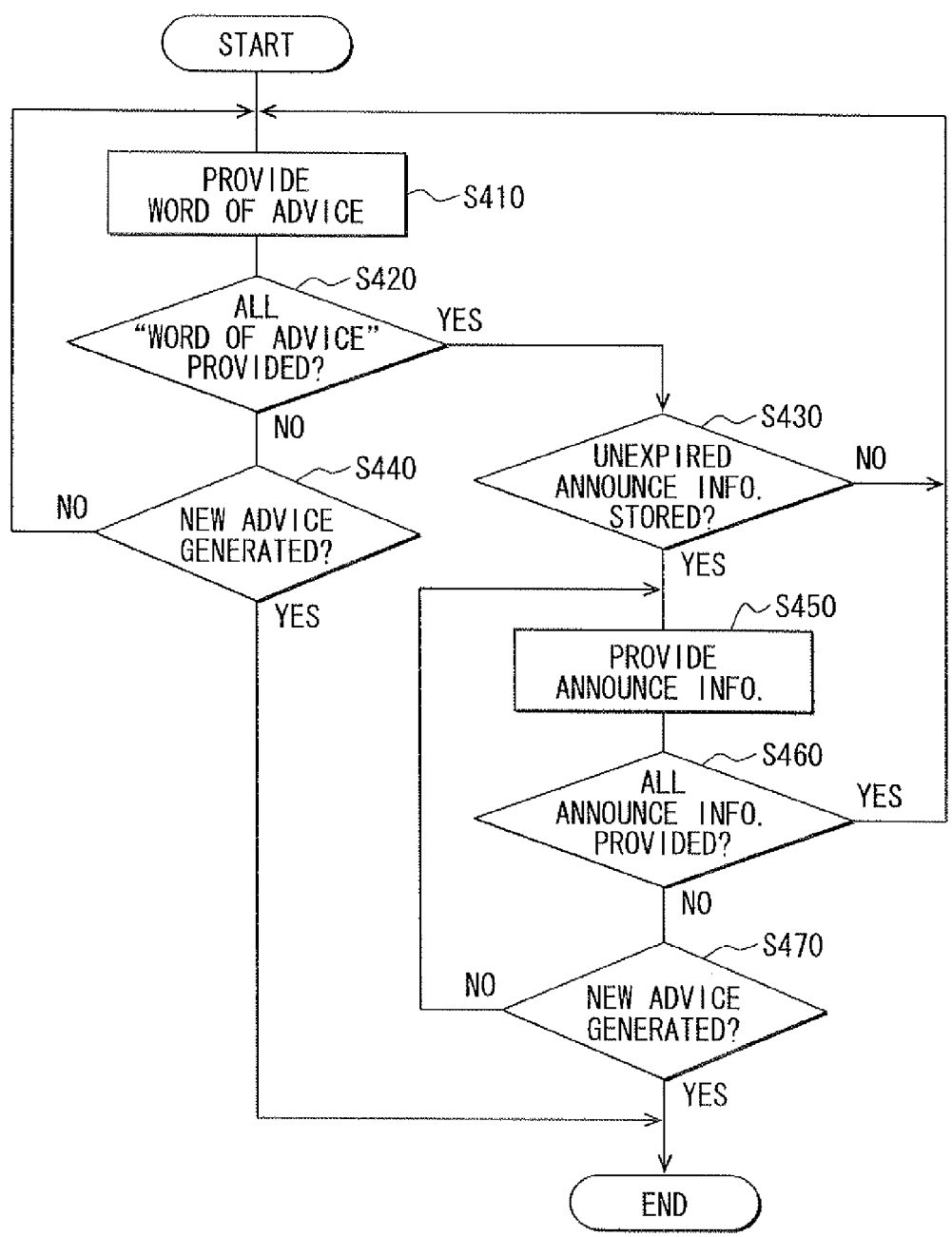
FIG. 8 is a flowchart illustrating a second useful information providing procedure in accordance with one embodiment.

With reference to FIGS. 7 and 8, explanation is given below on a first useful information providing procedure and a second useful information providing procedure, which are executed by the control circuit 115. The first useful information providing procedure illustrated in FIG. 7 is performed in, for example, the providing zone (1) exemplified in FIG. 3. The second useful information providing procedure illustrated in FIG. 8 is performed in, for example, the providing zones (2) (3) exemplified in FIG. 3. In the followings, the advice is also referred to as normal advice to clearly distinguish the advice, which is generated in the procedure illustrated in FIG. 5, from the word of advice.

Explanation will be given below on the first useful information providing procedure illustrated in FIG. 7. The first useful information providing procedure is cyclically performed during a period from the turning on of the accessory switch until the first time advice generation corresponding to, for example, the end point of the second evaluation zone (see FIG. 3).

At S310, it is determined whether the announce information unexpired is stored in the useful information storing part 155. When the announce information unexpired is not stored in the useful information storing part 155, corresponding to "NO" at S310, the process proceeds to S320. It should be noted that the announce information stored in the useful information storing part 155 is cyclically checked, and the announce information expired is deleted in the checking. In a similar way, the word of advice stored in the useful information storing part 155 is cyclically checked, and the word of advice expired is deleted in the checking.

The useful information storing part 155 stores therein a variety of "word of advice", to each which priority is pre-assigned. At S320, some "word of advice" that has not been provided yet is displayed on the screen of the display device 109 in order of descending priority. In connection with S320, it is managed whether each of the variety of "word of advice" has not been provided yet, by using flag information for instance. The flag information is reset when the first useful information providing procedure is ended or when the normal advice is newly generated.

After S320, the process proceeds to S330 where it is determined whether the normal advice is generated. When it is determined that the normal advice is not generated, corresponding to "NO" at S330, the process returns to S320. When it is determined that the normal advice is generated, corresponding to "YES" at S330, the first useful information providing procedure is ended.

When it is determined at S310 that the announce information unexpired is stored in the useful information storing part 155, corresponding to "YES" at S310, the process proceeds to S340. The useful information storing part 155 stores therein a variety of announce information, to each which priority is pre-assigned. At S340, some announce information that has not been provided yet are displayed on the screen of the display device 109 in order of descending priority. In connection with S340, it is managed whether each of the variety of announce information has not been provided yet, by using flag information for instance. The flag information is reset when the first useful information providing procedure is ended or when the normal advice is newly generated.

After S340, the process proceeds to S350. At S350, it is determined whether the normal advice is generated. When the normal advice is not generated, corresponding to "NO" at S350, the process returns to S340. When the normal advice is generated, corresponding to "YES" at S350, the first useful information providing procedure is ended.

Explanation will be given on the second useful information providing procedure illustrated in FIG. 8. The second useful information providing procedure is performed after the advice is provided for the first time, for example, at the end point of the second evaluation zone (see FIG. 3).

The useful information storing part 155 stores therein a variety of "word of advice", to each which priority is pre-assigned. At S320, some "word of advice" that has not been provided yet is displayed on the screen of the display device 109 in order of descending priority. In connection with S410, it is managed whether each "word of advice" has not been provided yet, by using flag information for instance. The flag information is reset when the second useful information providing procedure is ended or when the normal advice is newly generated.

At S420, it is determined whether all of the word of advice stored in the useful information storing part 155 has been provided, in other words, it is determined whether all of the word of advice stored in the useful information storing part 155 is displayed on the screen. When it is determined that some "word of advice" has not been provided yet, corresponding to "NO" at S420, the process proceeds to S440.

At S440, it is determined whether the normal advice is newly generated. When the normal advice is not newly generated, corresponding to "NO" at S440, the process returns to S410. When the normal advice is newly generated, corresponding to "YES" at S440, the second useful information providing procedure is ended.

When it is determined at S420 that all of the word of advice has been provided already, corresponding "YES" at S420, the process proceeds to S430. At S430, it is determined whether the announce information unexpired is stored in the useful information storing part 155.

When it is determined that the announce information unexpired is not stored in the useful information storing part 155, corresponding to "NO" at S430, the process returns to S410. When it is determined that the announce information unexpired is stored in the useful information storing part 155, corresponding to "YES" at S430, the process proceeds to S450.

The useful information storing part 155 stores therein a variety of announce information, to each which priority is pre-assigned. At S450, some announce information that has not been provided yet are displayed on the screen of the display device 109 in order of descending priority. In connection with S450, it is managed whether each of the variety of announce information has not been provided yet, by using flag information. The flag information is reset when the second useful information providing procedure is ended or when the normal advice is newly generated.

After S450, the process proceeds to S460. At S460, it is determined whether all of the announce information stored in the useful information storing part 155 has been provided. When it is determined that the all of the announce information has been provided, corresponding to "YES" at S460, the process returns to S410.

When it determined at S460 that some announce information has not been provided yet, corresponding to "NO" at S460, the process proceeds to S470. At S470, it is determined whether the normal advice is newly generated. When the normal advice is not newly generated, corresponding to "NO" at S470, the process returns to S450.

When it is determined that the normal advice is newly generated, corresponding to "YES" at S470, the second useful information providing procedure is ended.

FIG. 9 is a diagram illustrating one exemplary display according to one embodiment.

The display illustrated in FIG. 9 contains at least information items indicative of status information, an eco level, fuel consumption information, an accumulative point, and advice. The status information indicates classes of driving level and driving skill of a driver by using different colors. Letters for the status information are displayed in different colors according to levels. For example, the gold letters indicates the best, the silver letters the second best, the blue letters the third best.

The eco level indicates a degree of economy in driving. The eco level is determined and ranked by, for example, comprehensively evaluating diagnosis results regarding diagnosis items such as the fuel efficiency, the eco-mode traveling ratio, the eco-lamp turn on ratio, the specific mode selection ratio, the accelerator over-depressing ratio, the inadequate gear selection ratio and the like. A zone or a period for evaluation may be arbitrarily set by a driver. The zone or period for evaluation may be 1 minute or a trip period, which is for example between a time of turning on the accessory switch and a time of turning off the accessory switch.

A fuel consumption at a predetermined time is displayed as fuel efficiency information. The cumulative point is sum of points given to the driver up to now. Explanation on points will be given, below. In one embodiment, the result of diagnosis regarding the driving state is transmitted from the driving diagnosis information providing apparatus 10 to the server 4 where points to be given to the driver are calculated based on the result of diagnosis and recorded. The driving diagnosis information providing apparatus 10 can downloads information about the points from the server 4. The points to be given to the driver is managed by the sever 4 and may be utilized to pay for fees in various situations such as shopping, fueling, tollbooth in expressway and the like. The points can be thus used to provide benefits to a driver who drives a vehicle economically or safely, encouraging the economical driving or the safety driving, leading to the improvement of fuel efficiency, the reduction of exhaust gas, and the reduction of traffic accidents.

As shown in FIG. 9, the advice generated through the advice generation procedure illustrated in FIG. 5, the announce information, or the word of advice is displayed in a space for advice. FIG. 10 is a diagram illustrating examples of advice to be displayed on the space for advice.

According to the above embodiments, it is possible to provide the advice to the driver based on the result of diagnosis regarding the driving state, and it is thereby possible to improve the driving state. Further, it is possible to notify the announce information and the word of advice in addition to the advice, and thus, it is possible to prevent the driver from being bored. It is therefore possible to minimize the reduction of driver interest into information notified to the driver.

According to the above embodiments, in particular, it is possible to provide the announce information or the word of advice in a zone where the advice cannot be provided (e.g., the first or second evaluation zone, see FIG. 3) or in a zone where the advice is not provided (e.g., zone (7), zone (8)). According to the above manner, the providing of the normal advice is not interrupted.

Moreover, according to the above embodiments, it is possible to provide the same advice up to two times a vehicle makes a stop in, for example, a zone (5) or (6). It is possible to prevent the driver from overlooking the advice. After the same advice is provided two times, the announce information or the word of advice is provided. It is thus possible to prevent the driver from being bored.

According to the above embodiments, the expired announce information and the expired word of advice are removed from a variety of announce information and a variety of "word of advice" stored in the useful information storing part 155. It is thus possible to prevent unnecessary old information from being provided to a driver.

According to the above embodiments, since a variety of "word of advice" and a variety of announce information are successively provided according to predetermined priority, it is possible to promptly and effectively provide information having, for example, a higher degree of usefulness.

In the above embodiment, the vehicle I/F 113 can function as a vehicle information acquisition means or section. The driving diagnosis part 151 can function as a diagnosis means or section. The advice generation part 153 performing S240 to S300 can function as an advice generation means or section, and a notification means or section. The control circuit 115 performing S320, S340, S410, S450 can function as a useful information acquisition section or means.

The above described embodiments can be modified in various ways, examples of which will be described below.

In the above embodiment, the advice is provided each time a vehicle makes a stop, until the number of times the advice is provided reaches two times. Alternatively, if a stoppage period of the vehicle is shorter than a predetermined period, the notification of the advice in the short stoppage period may be excluded from counting the number of times.

In the above embodiment, the advice, the word of advice or the announce information is provided when the vehicle makes a stop. Alternatively, if the vehicle starts traveling while the advice, the word of advice or the announcement information is being notified, the notification may be suspended so that the driver can concentrate on driving. The suspended notification may be resumed in a next time when the vehicle makes a stop.

In the above embodiment, the announce information and the word of advice are examples of information to be provided to a driver. Another type of Information may be provided to a driver. In the above embodiment, as the fuel efficiency information illustrated in FIG. 9, a fuel efficiency averaged over a predetermined period may be alternatively displayed, or, a fuel efficiency variation during a predetermined period may be displayed by using a graph.

The above embodiments and modifications may have the following aspects.

According to a first aspect, a driving diagnosis information providing apparatus for a vehicle is provided. The driving diagnosis information providing apparatus includes a vehicle information acquisition section, a diagnosis section, a useful information acquisition section, and a notification section. The vehicle information acquisition section acquires vehicle information indicative of a vehicle state. The diagnosis section makes a diagnosis of a driving state of the vehicle based on the vehicle information acquired by the vehicle information acquisition section. The useful information acquisition section acquires, as useful information, at least one of announce information and helpful information. The announce information includes information to be reported to a driver of the vehicle. The helpful information includes information helpful for driving. The notification section notifies the driver of diagnosis information indicative of a result of the diagnosis made by the diagnosis section, and notifies the driver of the useful information in place of the diagnosis information under a predetermined condition.

The above driving diagnosis information providing apparatus can be configured to acquire the announce information and the helpful information from an outside of the vehicle via a communication network. The announce information may include, for example, traffic information such as accident information, traffic jam information and the like, adverting information, or the like. The helpful information may include, for example, bits of knowledge regarding eco, driving or the like.

According to the above driving diagnosis information providing apparatus, it is possible to notify a driver of diagnosis information, which can improve the driving state. Further, since it is possible to notify the announcement information or the helpful information in addition to the diagnosis information, it is possible to restrict the driver from being bored. It is possible to improve joy for a driver accordingly. Further, it is possible to provide a driver with various types of information at various times un-monotonously. It is possible to prevent a driver from adapting himself or herself to the notification of diagnosis information, and it is possible to prevent the driver from not taking care of the diagnosis information. The above driving diagnosis information providing apparatus maintains the merit associated with the notification of diagnosis information for a long period of time.

Alternatively, the above driving diagnosis information providing apparatus may be configured in the following ways. The diagnosis section (i) computes the driving state of the vehicle in each of predetermined traveling zones, (ii) compares the computed driving state in a diagnosis target traveling zone to the computed driving state in a comparison target traveling zone, and (iii) thereby makes the diagnosis of quality of the driving state in the diagnosis target traveling zone. The diagnosis target traveling zone is one of the predetermined traveling zones and is a target for the diagnosis. The comparison target traveling zone is another one of the predetermined zones and is different from the diagnosis target traveling zone. The predetermined traveling zones include a first traveling zone and a secondly traveling zone after the first traveling zone. The notification section notifies the driver of the useful informational least prior to an end point of the second traveling zone.

The above driving diagnosis information providing apparatus can make a relative evaluation of a driving state, and can make precise evaluation between comparison targets, thereby enabling a driver to clearly understand, for example, whether the present driving state is improving or worsening.

According to the above described relative evaluation, it may not possible to provide a result of the evaluation and the diagnosis information before end points of the first and second traveling zones where a target for evaluation does not exist. Even in the above case, the above driving diagnosis information providing apparatus can notify a driver of the announce information or the helpful information, thereby providing benefits to the driver.

The above driving diagnosis information providing apparatus may further include an advice generation section that is configured to generate advice to be provided to the driver, based on a result of the diagnosis made by the diagnosis section, wherein the notification section notifies the driver of the advice as the diagnosis information.

From a viewpoint of improving a driving state, the above driving diagnosis information providing apparatus can enable a driver to take measures by following the advice, providing effective merits. The above driving diagnosis information providing apparatus may be configured as follows. The notification section notifies the driver of the advice having a first content each time when the vehicle makes a stop, if a number of times the notification section notifies the driver of the advice having the first content is less than a predetermined number of times; and after the number of times reaches the predetermined number of times, the notification section notifies the driver of the useful information each time when the vehicle makes a stop, until the advice generation unit generates the advice having a second content different from the first content.

The above driving diagnosis information providing apparatus can successively notify a driver of the same advice the predetermined number of times, thereby preventing the driver from overlooking the advice. After notifying the same advice the predetermined number of times, the driving diagnosis information providing apparatus then notifies the driver of the announce information or the helpful information to prevent the driver from being bored.

The above driving diagnosis information providing apparatus may be configured as follows. The notification of the advice made in a short stoppage period of the vehicle, the short stoppage period being shorter than a predetermined period, is excluded from counting the number of times.

According to the above driving diagnosis information providing apparatus, it is possible to excludes the notification made in a short stoppage period from counting the number of times. In a case of traffic jam or the like, it is possible to prevent the notification of the advice from being insufficient.

The above driving diagnosis information providing apparatus may be configured to as follows. If the vehicle starts traveling while the notification section is notifying the driver of one of the advice, the announce information and the helpful information, the notification section suspends the notification of the one of the advice, the announce information and the helpful information, and provides the suspended notification to the driver at a next stop of the vehicle.

Since it is possible to suspend the notification when the vehicle starts traveling, the driver can concentrate on driving, and it is possible ensure safety. Since the notification suspended at a previous stop is provided again to the driver at a next stop, the notification does not remain suspended and it is possible to eliminate anxiety.

The above driving diagnosis information providing apparatus may further includes a memory and a memory control section that records the announce information and the helpful information acquired by the useful information acquisition section in the memory. The notification section reads at least one of the announce information and the helpful information from the memory to notify the driver of the at least one of the announce information and the helpful information. The announce information contains information for indicating whether the announce information is expired. The helpful information contains information for indicating whether the helpful information is expired. The memory control section deletes the expired announce information and the expired helpful information from the memory.

According to the above driving diagnosis information providing apparatus, it is possible to prevent unnecessary old information, e.g., unnecessary old announce information and unnecessary old helpful information, from being notified to the driver. In other words, it is possible to notify fresh information or timely information, and it is possible to provide joy for a driver.

The driving diagnosis information providing apparatus may be configured as follows. The announce information includes a plurality of announce information with pre-assigned priorities. The helpful information includes a plurality of helpful information with pre-assigned priorities. The notification section notifies the driver of the plurality of announce information and the plurality of helpful information in order of descending priority based on the pre-assigned priorities.

According to the above driving diagnosis information providing apparatus, it is possible to preferentially notify the driver of, for example, the announce information or helpful information that should be rapidly notified to the driver. It is possible to further improve the merits associated with notifying the announce information and the helpful information. In the above, the priorities may be changed, for example, in each traveling zone.

According to a second aspect, a driving diagnosis information providing system is provided that include an in-vehicle apparatus that is equipped in a vehicle and a server that is communicatable with the in-vehicle apparatus. The sever includes a useful information storing part that stores therein announce information and helpful information. The announce information includes information to be reported to a driver. The helpful information includes information helpful for driving. The in-vehicle apparatus includes: a vehicle information acquisition section that is configured to acquire vehicle information indicative of a vehicle state; a diagnosis section that is configured to make a diagnosis of a driving state of the vehicle based on the vehicle information acquired by the vehicle information acquisition section; a useful information acquisition section that is configured to acquire at least one of the announce information and the helpful information from the server; and a notification section that is configured to notify a driver of diagnosis information indicative of a result of the diagnosis made by the diagnosis section, and that is configured to notify the driver of the acquired one of the announce information and the helpful information in place of the diagnosis information under a predetermined condition.

The above driving diagnosis information providing system can provide similar advantages or merits as the above-described driving diagnosis information providing apparatus.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying, the invention, other combinations and configurations, including more, less or only a single element, are also contemplated as being within the scope of embodiments.

Further, each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

The invention claimed is:

1. A driving diagnosis information providing apparatus for a vehicle, comprising:
a vehicle information acquisition section that is configured to acquire vehicle information indicative of a vehicle state;
a diagnosis section that is configured to successively make a diagnosis of a driving state of the vehicle based on the vehicle information indicative of the vehicle state in predetermined intervals, the vehicle information being acquired by the vehicle information acquisition section;
a useful information acquisition section that is configured to acquire, as useful information, at least one of announce information and helpful information, the announce information including information to be reported to a driver of the vehicle, the helpful information including information helpful for driving;
a notification section that is configured to successively notify the driver of diagnosis information indicative of a result of the diagnosis made by the diagnosis section, and that is configured to notify, within one predetermined interval for the diagnosis section to make the diagnosis for the next diagnosis information, the driver of the useful information in place of the previous diagnosis information; and
an advice generation section that is configured to generate advice as the diagnosis information, based on a result of the diagnosis made by the diagnosis section,
wherein
the useful information is based on data that is not indicative of the vehicle state,
the useful information is based on data that is not related to the area adjacent to the vehicle,
the result of the diagnosis made by the diagnosis section and which is indicated by the diagnosis information notified to the driver, is either a level of driving economy of the vehicle or a class of the driver's skill,
the notification section initially notifies the driver of the advice having a first content each time when the vehicle makes a stop, if a number of times the notification section has notified the driver of the advice having the first content is less than a predetermined number of times; and
after the number of times the notification section has notified the driver of the advice having the first content reaches the predetermined number of times, the notification section notifies the driver of the useful information each time the vehicle makes a stop, until the advice generation unit generates the advice having a second content different from the first content.

2. The driving diagnosis information providing apparatus according to claim 1, wherein:
the diagnosis section
(i) computes the driving state of the vehicle in each of the predetermined intervals,
(ii) compares the computed driving state in a diagnosis target interval to the computed driving state in a comparison target interval, the diagnosis target interval being one of the predetermined intervals and being a target for the diagnosis, the comparison target interval being another one of the predetermined intervals and being different from the diagnosis target interval, and
(iii) thereby makes the diagnosis of quality of the driving state in the diagnosis target interval;
the predetermined intervals include a first interval and a second interval after the first interval;
the notification section notifies the driver of the useful information at least prior to an end point of the second interval; and
the predetermined intervals are predetermined periods or predetermined traveling zones.

3. The driving diagnosis information providing apparatus according to claim 1, wherein:
the notification of the advice made in a short stoppage period of the vehicle, the short stoppage period being shorter than a predetermined period, is excluded from counting the number of times.

4. The driving diagnosis information providing apparatus according to claim 1, wherein:
if the vehicle starts traveling while the notification section is notifying the driver of one of the advice, the announce information and the helpful information, the notification section suspends the notification of the one of the advice, the announce information and the helpful information, and provides the suspended notification to the driver at a next stop of the vehicle.

5. The driving diagnosis information providing apparatus according to claim 1, further comprising:
a memory; and a memory control section that records the announce information and the helpful information acquired by the useful information acquisition section in the memory, wherein:

the notification section reads at least one of the announce information and the helpful information from the memory to notify the driver of the at least one of the announce information and the helpful information, the announce information contains information for indicating whether the announce information is expired;

the helpful information contains information for indicating whether the helpful information is expired; and the memory control section deletes the expired announce information and the expired helpful information from the memory.

6. The driving diagnosis information providing apparatus according to claim 1, wherein:

the announce information includes a plurality of announce information with pre-assigned priorities;

the helpful information includes a plurality helpful information with pre-assigned priorities; and the notification section notifies the driver of the plurality of announce information and the plurality of helpful information in order of descending priority based on the pre-assigned priorities.

7. The driving diagnosis information providing apparatus according to claim 1, wherein the useful information is received from a remote server.

8. A driving diagnosis information providing apparatus, as recited in claim 1, wherein the useful information comprises at least one of: accident information, traffic jam information, advertising information, and prestored driving knowledge that is based on the data that is not indicative of the vehicle state.

9. A driving diagnosis information providing system comprising:

an in-vehicle apparatus that is equipped in a vehicle;

a server that is communicable with the in-vehicle apparatus, wherein the server includes a useful information storing part that stores therein announce information and helpful information, the announce information including information to be reported to a driver, the helpful information including information helpful for driving, wherein the in-vehicle apparatus includes:

a vehicle information acquisition section that is configured to acquire vehicle information indicative of a vehicle state;

a diagnosis section that is configured to successively make a diagnosis of a driving state of the vehicle based on the vehicle information indicative of the vehicle state in predetermined intervals, the vehicle information being acquired by the vehicle information acquisition section;

a useful information acquisition section that is configured to acquire at least one of the announce information and the helpful information as useful information from the server;

a notification section that is configured to successively notify a driver of diagnosis information indicative of a result of the diagnosis made by the diagnosis section, and that is configured to notify, within one predetermined interval for the diagnosis section to make the diagnosis for the next diagnosis information, the driver of the acquired one of the announce information and the helpful information in place of the diagnosis information; and an advice generation section that is configured to generate advice as the diagnosis information, based on a result of the diagnosis made by the diagnosis section, wherein the announce information and the helpful information are both based on data that is not indicative of the vehicle state, the announce information and the helpful information are both based on data that is not related to the area adjacent proximate to the vehicle, the result of the diagnosis made by the diagnosis section and which is indicated by the diagnosis information notified to the driver, is either a level of driving economy of the vehicle or a class of the driver's skill, the notification section initially notifies the driver of the advice having a first content each time when the vehicle makes a stop, if a number of times the notification section has notified the driver of the advice having the first content is less than a predetermined number of times; and after the number of times the notification section has notified the driver of the advice having the first content reaches the predetermined number of times, the notification section notifies the driver of the useful information each time the vehicle makes a stop, until the advice generation unit generates the advice having a second content different from the first content.

10. A driving diagnosis information providing system, as recited in claim 9, wherein the announce information comprises at least one of: accident information, traffic jam information, and advertising information.

11. A driving diagnosis information providing system, as recited in claim 9, wherein the helpful information comprises prestored driving knowledge that is based on the data that is not indicative of the vehicle state.

* * * * *